Patented Oct. 30, 1934

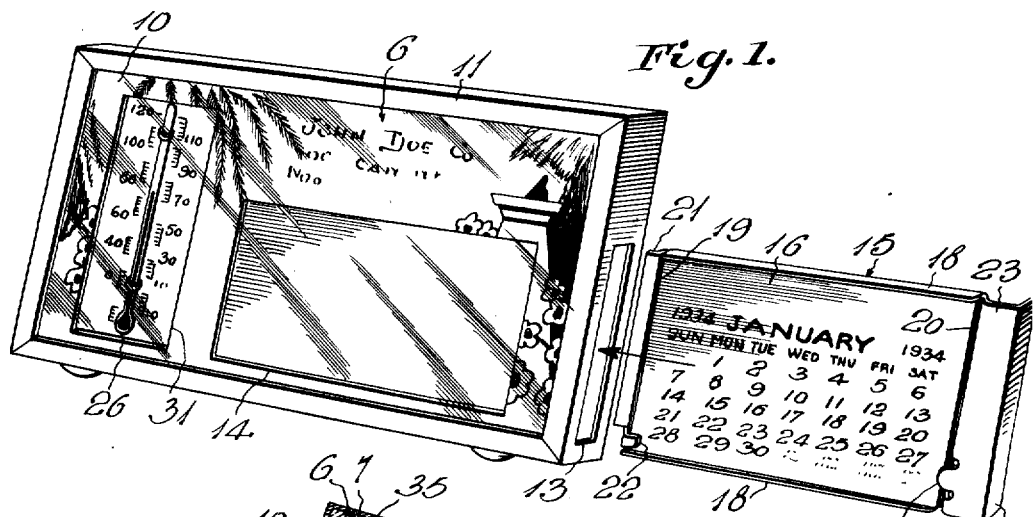

1,979,005

UNITED STATES PATENT OFFICE 1,979,005

CALENDAR HOLDING MEANS

Carlyle N. Montanye, Baltimore, Md.

Application March 16, 1934, Serial No. 715,957

3 Claims. (Cl. 40—122)

The invention aims to provide a simple, inexpensive and attractive article of manufacture which may be used for holding a calendar or other flat article. A framed holder is provided having a pocket, and a slide carrying the calendar or the like is insertable into and withdrawable from said pocket. The holder may well bear an advertisement and be sent with the slide and calendar to business prospects, and each succeeding year, a new slide and calendar may be forwarded to replace those used during the expired year. The device may thus constitute an effective means of keeping the name of any business concern before prospects, yet will be a very inexpensive advertising novelty.

Fig. 1 of the accompanying drawing is a perspective view showing the calendar carrying slide in readiness for insertion into the framed holder.

Fig. 2 is a fragmentary perspective view showing the slide and calendar completely within the holder.

Figs. 3 and 4 are sectional views on lines 3—3 and 4—4 of Fig. 2.

Fig. 5 is a detail perspective view showing the preferred manner of connecting a supporting leg to the framed holder.

A preferred construction has been illustrated in the drawing and will be specifically described, with the understanding however, that within the scope of the invention as claimed, minor variations may be made.

A panel is provided by disposing four thicknesses of material 6, 7, 8 and 9 in contact with each other. The thicknesses 7 and 8 may well be cheap cardboard, the thickness 6 a printed or other decorated sheet of better grade cardboard, and the thickness 9 a suitable sheet of backing paper. A glass cover 10 preferably lies against the front sheet 6, and all of the parts 6 to 10 inclusive are held in a channel-shaped frame 11. A rectangular opening 12 is formed in the cardboard thickness 7, providing a pocket, one end of the frame 11 is formed with a slot 13 communicating with this pocket, and the front sheet 6 is provided with a view opening 14 at the front of said pocket.

A rectangular slide 15 is provided to carry the calendar 16 or other article to be displayed, said slide being insertable through the slot 13 into the pocket 12 and being withdrawable from said pocket. The calendar is of the pad or leaf type, in which a separate page is allotted to each month of the year, and at the beginning of any month, the slide 15 may be removed, the calendar page for the expired month torn off, and the slide reinserted. At the end of the year, either a new calendar pad may be inserted into the slide, or a new slide carrying a pad for the new year may be substituted for those previously used.

The slide 15 is stamped from a single piece of sheet metal and includes a rectangular plate 17 having two forwardly bent longitudinal side flanges 18 and two forwardly bent end flanges 19 and 20. The front edge of the flange 19 is preferably bent laterally outward to provide a reinforcing flange 21, the lower end of which may well be transversely cut and inwardly bent to provide a flat lug 22 which assists in holding the calendar or the like 16 within the shallow tray formed by the flanged plate. The flange 20 is provided with an outwardly projecting extension flange 23 which is relatively wide and is disposed in a plane forwardly spaced from and parallel with the plane of the plate 17. The lower end of this flange 23 may well be provided with an integral lug 24 stamped from the flange 20 and contiguous portion of the plate 17, said lug 24 lying against the front of the calendar 16 and co-acting with the lug 22 in holding it in place. These lugs prevent the various leaves of the calendar from having any tendency to curl and it is preferable that the function of holding the entire calendar pad in the tray or slide 15, be performed by a quantity of glue or the like connecting the last page with the plate 17. Even if this holding means be omitted however, the calendar will remain properly within the tray or slide.

The outer end of the extension flange 23 is rearwardly bent to provide a finger flange 25 which lies against the frame 11 when the slide is in position within the pocket 12, as clearly shown in Figs. 2 and 4. This finger flange is readily accessible for withdrawing the slide whenever desired.

The opening 14 is preferably so located as to occupy a rather large portion of the panel, a thermometer 26 preferably occupies another portion of said panel, and the remainder of the latter may be devoted to decoration and advertising. The back plate 27 of the thermometer is preferably inset in an opening 28 in the cardboard 8, being secured therein by a strip of adhesive 29 or in any other suitable way. The cardboard 7 is formed with an opening 30 alined with the opening 28, and a somewhat smaller view opening 31 is formed in the front sheet 6.

A sheet metal supporting leg 32 is provided for holding the device in an inclined position, said leg having a flat upper end portion 33 which lies against the rear side of the backing sheet 9, said portion 33 being secured at least to the thicknesses 8 and 9, by a staple or the like 34. The upper extremity of the leg portion 33 is forwardly bent to provide a flat flange 35 lying upon the upper edge of the panel and preferably of a width to extend across the thickness 8 and at least part way across the thickness 7. This flanged upper end of the leg is tightly held in the channel of the frame 11 and the leg is thus effectively braced against any loose movement about the connecting means 34. The formations 36 shown in Fig. 5 are merely weakening notches which permit easy bending of the leg 32 on the proper line, for disposal at the desired angle to the framed support or holder, it being understood that as the article is manufactured and placed on sale, said leg lies flat against the back of said support or holder.

It will be seen from the foregoing that simple and inexpensive provision has been made for attaining the desired end, and that the article will not only constitute an effective advertising novelty but will be convenient and desirable to the recipient or user. The slide 15 may be withdrawn whenever a page is to be torn from the calendar, and either a new slide and calendar may be furnished each year, or the old slide may be used and only a new calendar furnished for mounting in said slide.

Attention is again invited to the possibility of making minor variations within the scope of the invention as claimed.

I claim:—

1. In a device of the class described, a stamped metal slide comprising a rectangular plate having narrow forwardly bent longitudinal side flanges and narrow forwardly bent end flanges, said side and end flanges cooperating with said plate to provide a shallow tray to receive a calendar or other flat article, one of said end flanges being provided with a relatively wide integral extension flange projecting outwardly therefrom in a plane parallel with said plate, said extension flange being provided with a laterally bent outer end providing a finger piece for inserting the slide into and removing it from a holder.

2. A structure as specified in claim 1; said end flanges having inwardly projecting flat lugs integral therewith and positioned to lie against the front of the article to hold the latter in the tray.

3. In a device of the class described, a panel, a sheet metal leg having a flat upper end portion lying against the rear side of said panel, the upper extremity of said flat leg portion being bent forwardly upon the upper edge of said panel, means connecting said flat leg portion with said panel, and a channeled frame in which said panel and the upper end of said leg are held, said frame having a portion lying upon said forwardly bent leg extremity and holding the latter against said upper edge of said panel.

CARLYLE N. MONTANYE.